(12) United States Patent  (10) Patent No.: US 8,146,930 B2
Sicilia et al.  (45) Date of Patent: Apr. 3, 2012

(54) WHEEL ASSEMBLY WITH BEARING CAP HAVING A SEAL

(75) Inventors: Vincent R. Sicilia, Rochester, MI (US); Todd D. Albertson, Macomb Township, MI (US); Robert G. Sutherlin, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 12/788,842

(22) Filed: May 27, 2010

(65) Prior Publication Data

US 2011/0181101 A1 Jul. 28, 2011

Related U.S. Application Data

(60) Provisional application No. 61/297,942, filed on Jan. 25, 2010.

(51) Int. Cl.
*B62D 7/18* (2006.01)
(52) U.S. Cl. .................... 280/93.512; 277/635
(58) Field of Classification Search ............. 280/93.512, 280/124.113, 124.125; 384/448, 477, 484–486
See application file for complete search history.

(56) References Cited

U.S. PATENT DOCUMENTS

| | | | | |
|---|---|---|---|---|
| 3,479,051 A * | 11/1969 | Weiss | ................ | 280/93.512 |
| 3,563,564 A * | 2/1971 | Bartkowiak | ............ | 280/93.512 |
| 4,179,167 A * | 12/1979 | Lura et al. | .................... | 384/512 |
| 5,011,233 A * | 4/1991 | Nomura et al. | ............ | 301/108.1 |
| 5,852,361 A * | 12/1998 | Ouchi et al. | .................. | 324/174 |
| 6,029,986 A * | 2/2000 | Bodin et al. | ............. | 280/93.512 |
| 6,883,816 B2 * | 4/2005 | Baker et al. | ............. | 280/93.512 |
| 7,614,629 B2 * | 11/2009 | Dinakaran et al. | ....... | 280/93.512 |
| 7,686,313 B2 * | 3/2010 | Folger et al. | ............. | 280/93.512 |
| 7,934,732 B1 * | 5/2011 | Kinney et al. | ............ | 280/93.512 |
| 2010/0140895 A1 * | 6/2010 | Kurth et al. | ............. | 280/93.512 |

* cited by examiner

*Primary Examiner* — Drew Brown
(74) *Attorney, Agent, or Firm* — Quinn Law Group, PLLC

(57) ABSTRACT

A bearing cap for a wheel assembly includes a bearing cap seal for sealing against an annular bore of a knuckle. The bearing cap is coupled to an outer ring, which is disposed within an annular bore of a knuckle. The bearing cap includes a face and a collar extending along a longitudinal axis into the annular bore. The bearing cap seal is disposed annularly about the collar, within the annular bore. The bearing cap seal prevents contamination of an engagement interface between the knuckle and the outer ring.

20 Claims, 5 Drawing Sheets

WHEEL ASSEMBLY WITH BEARING CAP HAVING A SEAL

CROSS-REFERENCE TO RELATED APPLICATIONS

This application claims the benefit of U.S. Provisional Patent Application Ser. No. 61/297,942, filed on Jan. 25, 2010, the disclosure of which is hereby incorporated by reference.

TECHNICAL FIELD

The invention generally relates to a wheel assembly for a vehicle, and more specifically to a seal for a bearing cap of the wheel assembly.

BACKGROUND

Typical wheel assemblies include a knuckle, which is configured for attaching the wheel assembly to a vehicle. The knuckle defines an annular bore that extends along a longitudinal axis. The wheel assembly further includes an outer ring at least partially disposed within the bore. The outer ring includes a portion having an outside diameter substantially equal to an inside diameter of the annular bore of the knuckle, and engages the annular bore in an engagement interface therebetween to position the outer ring relative to the knuckle. The wheel assembly further includes a bearing disposed within an interior space of the outer ring, and a bearing cap disposed over an end of the outer ring. The bearing cap is generally press fit onto an outer surface of the outer ring, and spans across the interior space of the outer ring, thereby preventing contamination of the bearing. However, the bearing cap does not prevent contamination between the engagement interface of the knuckle and the outer ring.

In order to service or replace the bearing, it is often necessary to remove the outer ring from the knuckle. However, contamination of the wheel assembly, particularly from salt and/or chlorides used to melt snow and ice, may lead to corrosion of the engagement interface between the knuckle and the outer ring. If the corrosion is severe enough, the outer ring may seize within the knuckle, thereby preventing removal of the outer ring from the knuckle.

SUMMARY

The invention provides a wheel assembly. The wheel assembly includes a knuckle that defines an annular bore. The knuckle is configured for attachment to a vehicle. The wheel assembly further includes an outer ring at least partially disposed within the annular bore of the knuckle. The outer ring defines an interior space. A bearing cap is press fit onto an outside diameter of the outer ring. The bearing cap is configured for spanning across an end of the interior space of the outer ring to prevent contamination of a bearing. The bearing cap includes a seal in sealing engagement with the annular bore of the knuckle. The seal is configured to prevent contamination between the knuckle and the outer ring.

In another aspect of the invention, a bearing cap for an outer ring of a wheel assembly is provided. The bearing cap includes a face and a collar extending from an outer periphery of said face along a longitudinal axis to a distal edge, wherein said face is configured for spanning across an interior space of the outer ring and said collar is configured for engaging an outside diameter of the outer ring. The bearing cap includes a seal disposed on the collar and configured for engaging an annular bore of a knuckle and the outside diameter of the outer ring to prevent contamination between the knuckle and the outer ring.

Accordingly, the seal on the bearing cap seals against the inner diameter of the annular bore and the outside diameter of the outer ring to seal the wheel assembly internally between the knuckle and the outer ring. Sealing the wheel assembly against contamination between the knuckle and the outer ring helps prevent corrosion between the knuckle and the outer ring, which helps ensure that the outer ring does not seize within the annular bore of the knuckle.

The above features and advantages and other features and advantages of the present invention are readily apparent from the following detailed description of the best modes for carrying out the invention when taken in connection with the accompanying drawings.

DETAILED DESCRIPTION

Figure 1:
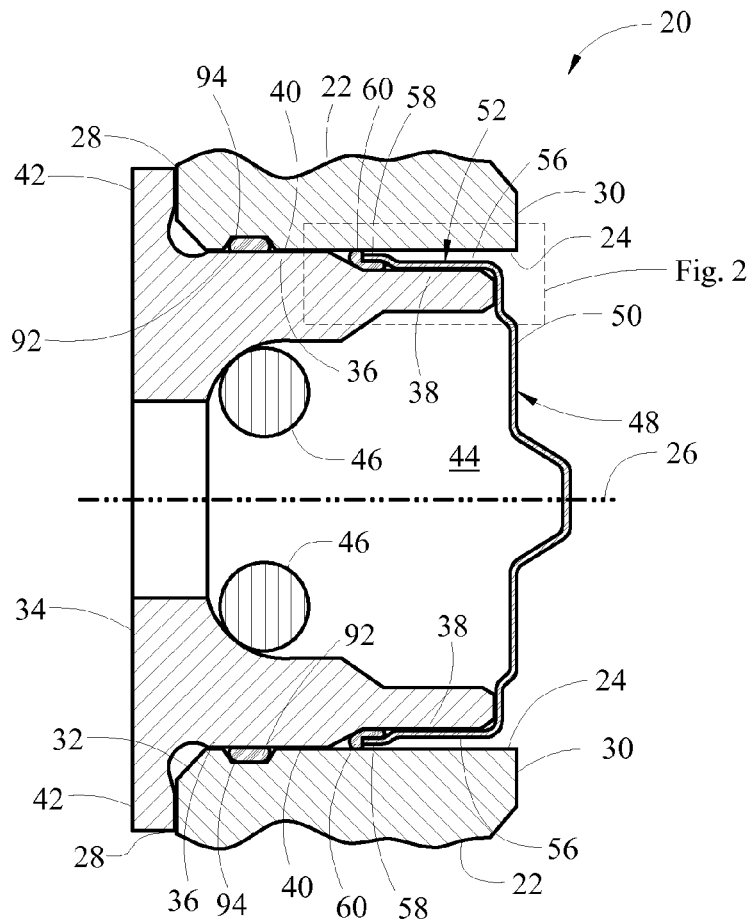
FIG. 1 is a fragmentary schematic cross sectional view of a wheel assembly showing a first embodiment of a seal for a bearing cap.

Referring to the Figures, wherein like numerals indicate corresponding parts throughout the several views, a wheel assembly is shown generally at 20. The wheel assembly 20 is for a vehicle, and rotatably supports a wheel (not shown) relative to the vehicle.

The wheel assembly 20 includes a knuckle 22. The knuckle 22 is configured for attachment to the vehicle. The knuckle 22 may be configured in any suitable fashion for attachment to the vehicle, and may be configured as required to satisfy any specific design parameters. The knuckle 22 defines an annular bore 24 that extends along a longitudinal axis 26. The annular bore 24 extends through the knuckle 22, between an outer surface 28 of the knuckle 22 and an inner surface 30 of the knuckle 22. The annular bore 24 includes a chamfered end 32 disposed adjacent the outer surface 28 of the knuckle 22. The chamfered end 32 eases insertion of an outer ring 34, described below, into the annular bore 24.

The wheel assembly 20 further includes the outer ring 34, otherwise referred to as a hub. The outer ring 34 is at least partially disposed within the annular bore 24 of the knuckle 22. The outer ring 34 includes an outer portion 36 and an inner portion 38. The inner portion 38 is axially spaced from the outer portion 36 along the longitudinal axis 26. The outer portion 36 of the outer ring 34 is disposed adjacent the outer surface 28 of the knuckle 22, and the inner portion 38 of the outer ring 34 is disposed adjacent the inner surface 30 of the knuckle 22. The outer portion 36 and the inner portion 38 of the outer ring 34 each include and/or define an outside diameter. The outside diameter of the inner portion 38 is less than the outside diameter of the outer portion 36, i.e., the inner portion 38 of the outer ring 34 is radially smaller than the outer portion 36 of the outer ring 34. As such, the outer ring 34 necks down from the outer portion 36 of the outer ring 34 to the inner portion 38 of the outer ring 34 along the longitudinal axis 26.

The outer portion 36 of the outer ring 34 engages the annular bore 24 of the knuckle 22 to define an engagement interface 40 therebetween. The outside diameter of the outer portion 36 of the outer ring 34 is substantially equal to an interior diameter of the annular bore 24 of the knuckle 22. As such, the tight engagement interface 40 between the annular bore 24 of the knuckle 22 and the outer portion 36 of the outer ring 34 concentrically align the outer ring 34 within the annular bore 24 along the longitudinal axis 26.

The outer ring 34 further includes a flange 42, which extends radially outward from the outer portion 36 of the outer ring 34, away from the longitudinal axis 26. The flange 42 engages the outer surface 28 of the knuckle 22. When in abutting engagement with the outer surface 28 of the knuckle 22, the flange 42 axially locates the outer ring 34 relative to the knuckle 22 along the longitudinal axis 26.

The outer ring 34 further defines an interior space 44. The interior space 44 is configured for supporting a bearing 46 therein. Accordingly, the bearing 46 is disposed within the interior space 44 of the outer ring 34. The bearing 46 rotatably supports a spindle (not shown) for rotation about the longitudinal axis 26 relative to the wheel assembly 20. The specific shape, size and configuration of the bearing 46 are not relevant to the description of the invention. Therefore, the bearing 46 is only shown schematically throughout the figures, and the specifics of the bearing 46 are not described in detail herein.

The knuckle 22 and the outer ring 34 preferably include and are manufactured from a metal, such as steel. However, it should be appreciated that the knuckle 22 and the outer ring 34 may include and be manufactured from some other suitable material not described herein that are capable of satisfying any specific design requirements of the wheel assembly 20.

The wheel assembly 20 further includes a bearing cap 48. The bearing cap 48 is mounted onto an outside diameter of the outer ring 34, adjacent the inside surface of the knuckle 22. More specifically, the bearing cap 48 is press fit onto the outside diameter of the inner portion 38 of the outer ring 34. The bearing cap 48 is configured for spanning across an end of the interior space 44 of the outer ring 34 to prevent contamination of the bearing 46. The bearing cap 48 includes a face 50 and a collar 52. The face 50 spans across, i.e., at least partially covers, the interior opening of the outer ring 34 adjacent the inner portion 38 of the outer ring 34. The collar 52 extends from an outer periphery of the face 50 along the longitudinal axis 26 to a distal edge 54. The collar 52 includes an intermediate portion 56 and a raised lip 58. The intermediate portion 56 engages the outside diameter of the outer ring 34. More specifically, the intermediate portion 56 engages the outside diameter of the inner portion 38 of the outer ring 34 in frictional engagement to secure the bearing cap 48 to the outer ring 34. The raised lip 58 is disposed between the annular bore 24 and the inner portion 38 of the outer ring 34, radially outward from the longitudinal axis 26 relative to the intermediate portion 56 and adjacent the distal edge 54 of the collar 52. Accordingly, the raised lip 58 is disposed at the distal edge 54 of the collar 52 and is radially expanded relative to the intermediate portion 56 about the longitudinal axis 26. As such, the raised lip 58 is laterally spaced a distance from the outside diameter of the inner portion 38 of the outer ring 34, and is also laterally spaced a distance from an interior surface 50 of the annular bore 24.

The bearing cap 48 includes a seal, i.e., a bearing cap seal 60. The bearing cap seal 60 is in sealing engagement with the annular bore 24 of the knuckle 22, and is also in sealing engagement with the outside diameter of the outer ring 34. More specifically, the bearing cap seal 60 is in sealing engagement with the outside diameter of the inner portion 38 of the outer ring 34. The bearing cap seal 60 prevents contamination from entering through an inner side of the wheel assembly 20 and becoming disposed between the knuckle 22 and the outer ring 34. Any contamination between the knuckle 22 and the outer ring 34 may lead to crevice corrosion between the knuckle 22 and the outer ring 34. Furthermore, if the knuckle 22 includes and is manufactured from aluminum and the bearing 46 includes and is manufactured from steel, then any contamination may lead to and/or accelerate galvanic corrosion between the aluminum knuckle 22 and the steel bearing 46. Any contamination and/or corrosion between the knuckle 22 and the outer ring 34 may lead to seizure of the outer ring 34 within the knuckle 22. As such, preventing contamination from becoming disposed between the knuckle 22 and the outer ring 34 helps prevent corrosion and/or seizure of the outer ring 34 within the knuckle 22, and prolongs the performance of the bearing 46.

Figure 2:
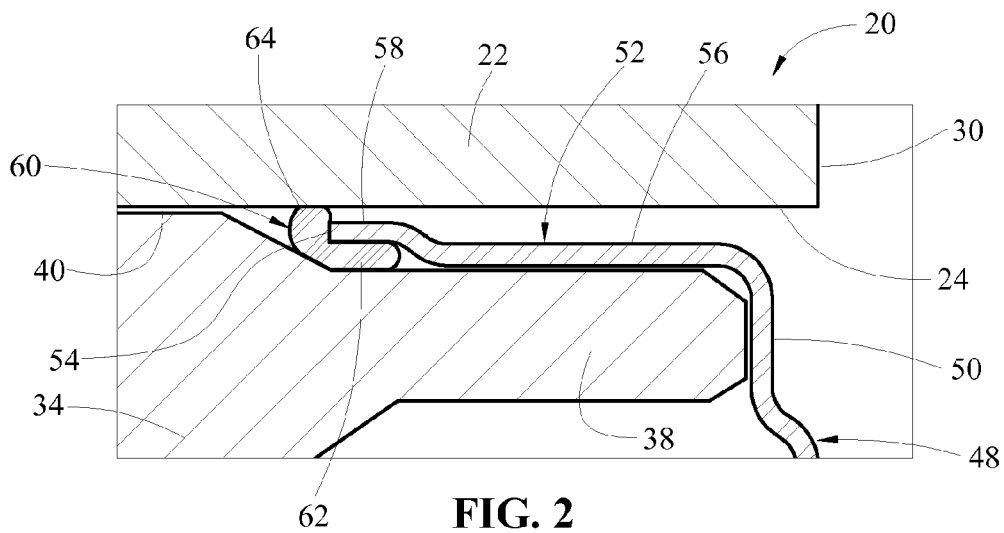
FIG. 2 is an enlarged fragmentary schematic cross sectional view of the first embodiment of the seal shown in FIG. 1.

A first embodiment of the bearing cap seal 60 is shown in FIGS. 1 and 2. The bearing cap seal 60 is disposed adjacent the distal edge 54 of the collar 52. The bearing cap seal 60 includes a first portion 62 and a second portion 64. The first portion 62 is disposed between the raised lip 58 and the outer ring 34. More specifically, the first portion 62 is disposed between the raised lip 58 and the inner portion 38 of the outer ring 34. The second portion 64 extends radially outward from the first portion 62 away from the longitudinal axis 26 into sealing engagement with the annular bore 24 of the knuckle 22. The second portion 64 is disposed adjacent the distal edge 54 of the collar 52.

Preferably, the first portion 62 and the second portion 64 of the bearing cap seal 60 are integrally formed together. However, it should be appreciated that the first portion 62 and the second portion 64 may be independent components coupled together. The bearing cap seal 60 may include any sealing material suitable for use in the wheel assembly 20 that is capable of compressing and sealing against both the outer ring 34 and the knuckle 22 when assembled. For example, the bearing cap seal 60 may include a rubber material or the like. It should be appreciated that the bearing cap seal 60 may include some other material not described herein.

During assembly, the bearing cap 48 is installed onto the outer ring 34, which compresses the first portion 62 of the bearing cap seal 60 between the raised lip 58 and the outside diameter of the inner portion 38 of the outer ring 34. The outer ring 34 is then inserted into the annular bore 24 of the knuckle 22. Upon insertion of the outer ring 34 and bearing cap 48 into the annular bore 24, the second portion 64 of the bearing cap seal 60 is compressed against the interior surface 50 of the annular bore 24. Accordingly, once installed, the bearing cap seal 60 seals the engagement interface 40 between the knuckle 22 and the outer ring 34 from contamination entering from an inner side of the wheel assembly 20.

Figure 3:
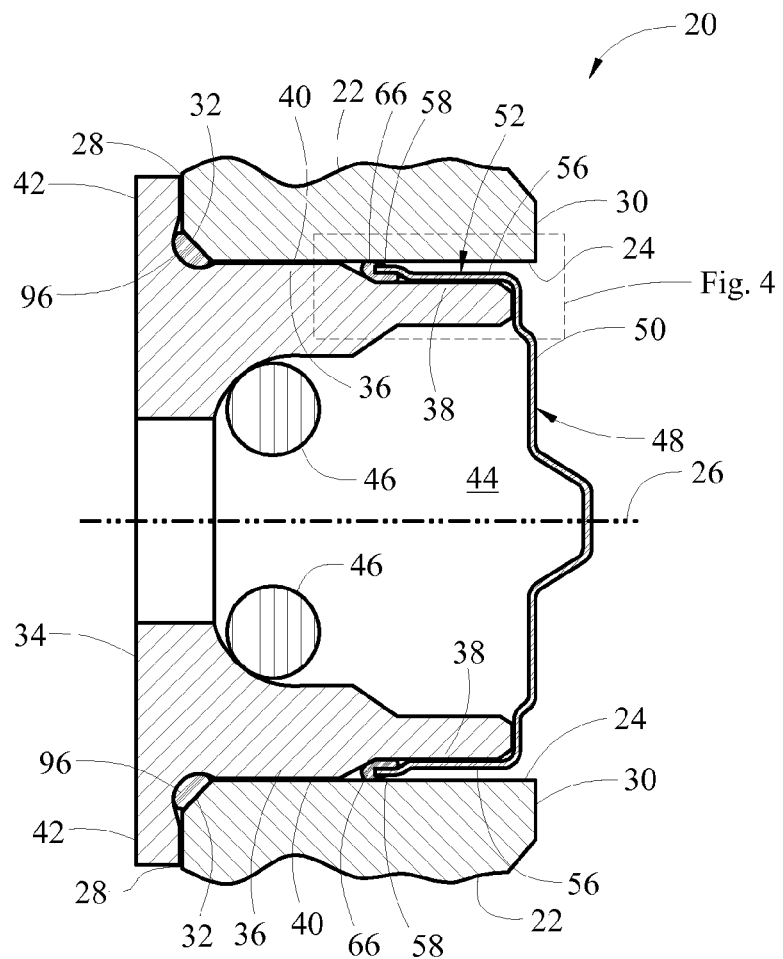
FIG. 3 is a fragmentary schematic cross sectional view of the wheel assembly showing a second embodiment of the seal for the bearing cap.
Figure 4:
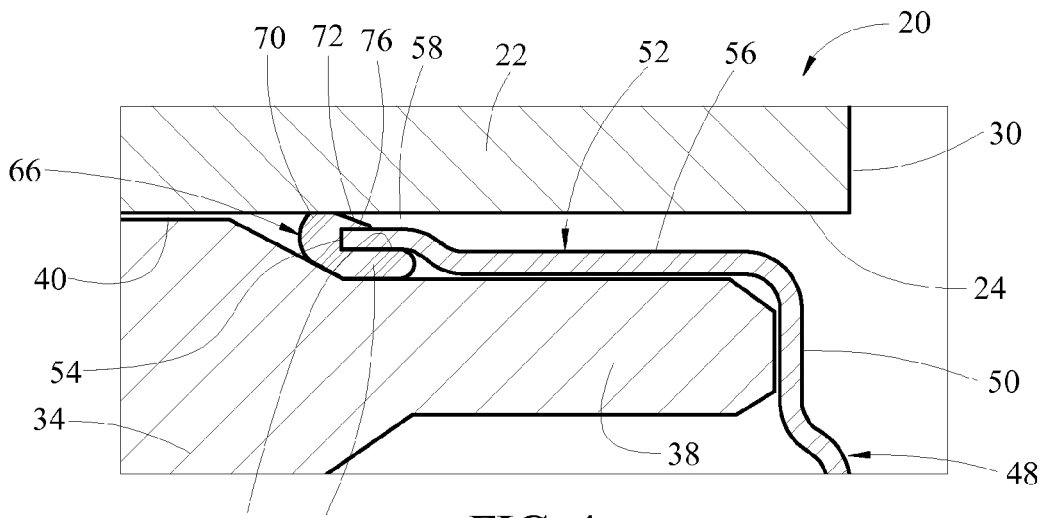
FIG. 4 is an enlarged fragmentary schematic cross sectional view of the second embodiment of the seal shown in FIG. 3.

Referring to FIGS. 3 and 4, a second embodiment of the bearing cap seal is shown generally at 66. The bearing cap seal 66 is disposed adjacent the distal edge 54 of the collar 52. The bearing cap seal 66 includes a first portion 68, a second portion 70 and a third portion 72. The first portion 68 is disposed between the raised lip 58 and the outer ring 34. More specifically, the first portion 68 is disposed between the raised lip 58 and the inner portion 38 of the outer ring 34. The second portion 70 extends radially outward from the first portion 68 away from the longitudinal axis 26 into sealing engagement with the annular bore 24 of the knuckle 22. The second portion 70 is disposed adjacent the distal edge 54 of the collar 52. The third portion 72 is disposed between the raised lip 58 and the annular bore 24, and extends along the longitudinal axis 26 toward, but short of, the intermediate portion 56 of the collar 52. The third portion 72 of the bearing cap seal 66 cooperates with the first portion 68 to define a channel 74 between the first portion 68 and the third portion 72. The channel 74 receives the distal edge 54 of the collar 52 therein, and secures the bearing cap seal 66 to the raised lip 58. The third portion 72 provides an angled surface 76 extending inward toward the longitudinal axis 26. The angled surface 76 of the third portion 72 eases installation of the outer ring 34/bearing cap 48 subassembly into the annular bore 24 of the knuckle 22.

Preferably, the first portion 68, the second portion 70 and the third portion 72 of the bearing cap seal 66 are integrally formed together. However, it should be appreciated that the first portion 68, the second portion 70 and the third portion 72 may be independent components coupled together.

Figure 5:
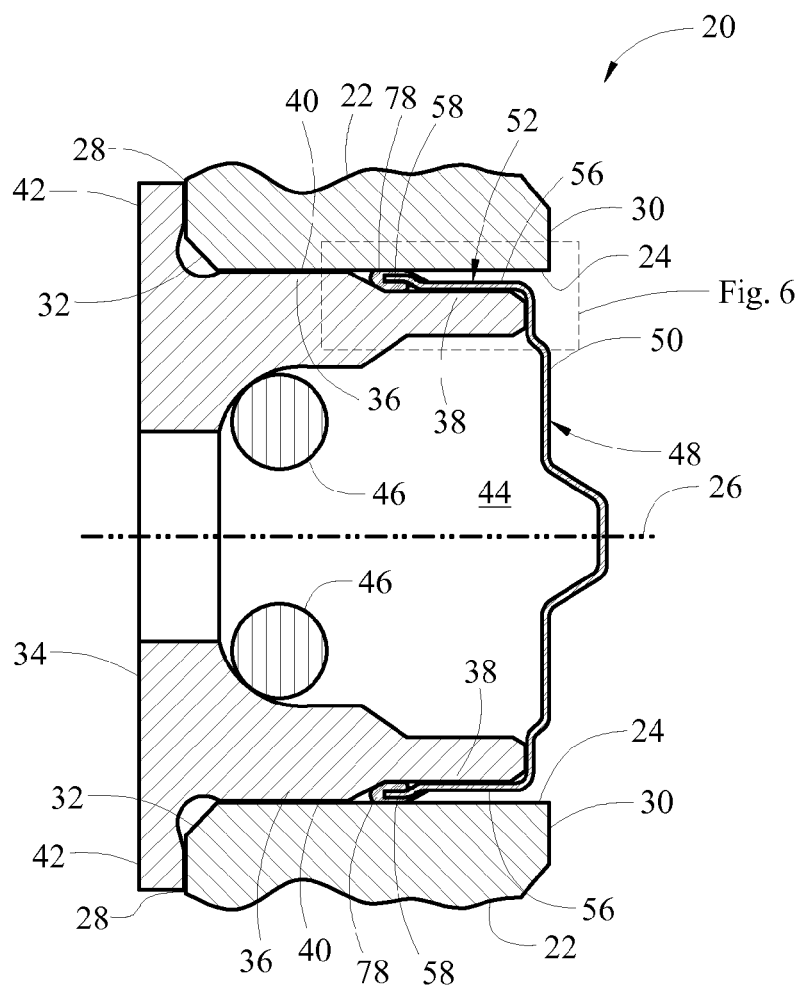
FIG. 5 is a fragmentary schematic cross sectional view of the wheel assembly showing a third embodiment of the seal for the bearing cap.
Figure 6:
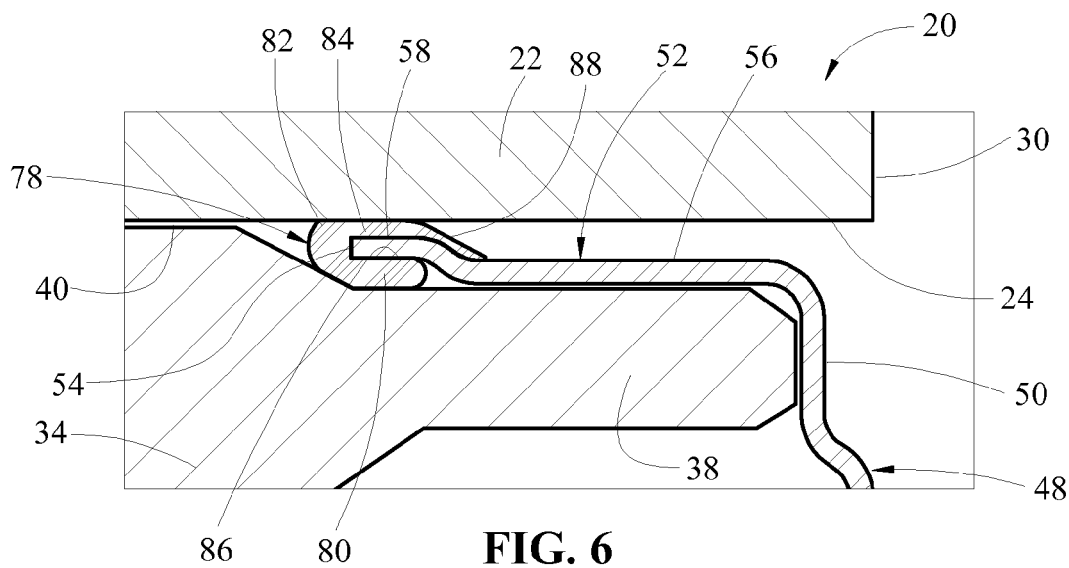
FIG. 6 is an enlarged fragmentary schematic cross sectional view of the third embodiment of the seal shown in FIG. 5.

Referring to FIGS. 5 and 6, a third embodiment of the bearing cap seal is shown generally at 78. The bearing cap seal 78 is disposed adjacent the distal edge 54 of the collar 52. The bearing cap seal 78 includes a first portion 80, a second portion 82 and a third portion 84. The first portion 80 is disposed between the raised lip 58 and the outer ring 34. More specifically, the first portion 80 is disposed between the raised lip 58 and the inner portion 38 of the outer ring 34. The second portion 82 extends radially outward from the first portion 80 away from the longitudinal axis 26 into sealing engagement with the annular bore 24 of the knuckle 22. The second portion 82 is disposed adjacent the distal edge 54 of the collar 52. The third portion 84 is disposed between the raised lip 58 and the annular bore 24, and extends along the longitudinal axis 26 toward and onto the intermediate portion 56 of the collar 52. Accordingly, the third portion 84 extends along the longitudinal axis 26, beyond the raised lip 58 to encapsulate the raised lip 58, and partially covers the intermediate portion 56 of the collar 52. The third portion 84 of the bearing cap seal 78 cooperates with the first portion 80 to define a channel 86 between the first portion 80 and the third portion 84. The channel 86 receives the distal edge 54 of the collar 52 therein, and secures the bearing cap seal 78 to the raised lip 58. The third portion 84 provides an angled surface 88 extending inward toward the longitudinal axis 26. The angled surface 88 of the third portion 84 eases installation of the outer ring 34/bearing cap 48 subassembly into the annular bore 24 of the knuckle 22.

Preferably, the first portion 80, the second portion 82 and the third portion 84 of the bearing cap seal 78 are integrally formed together. However, it should be appreciated that the first portion 80, the second portion 82 and the third portion 84 may be independent components coupled together.

Figure 7:
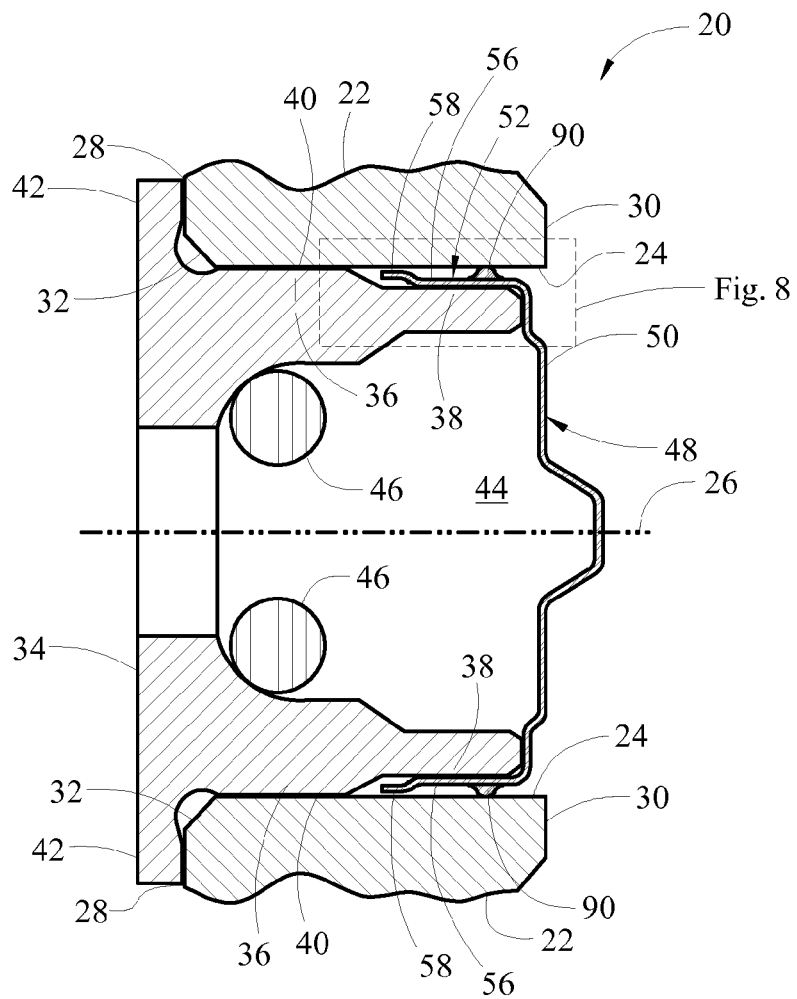
FIG. 7 is a fragmentary schematic cross sectional view of the wheel assembly showing a fourth embodiment of the seal for the bearing cap.
Figure 8:
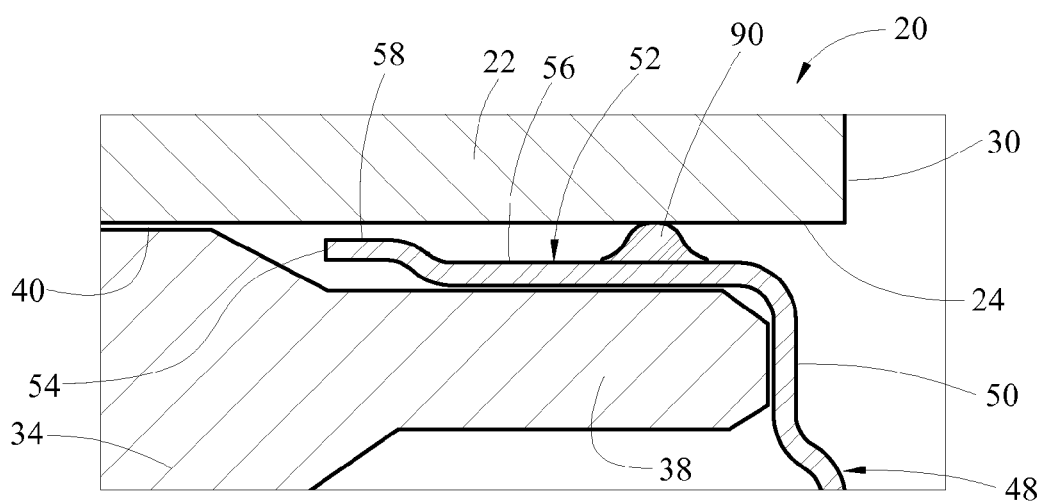
FIG. 8 is an enlarged fragmentary schematic cross sectional view of the fourth embodiment of the seal shown in FIG. 7.

Referring to FIGS. 7 and 8, a fourth embodiment of the bearing cap seal is shown generally at 90. The fourth embodiment of the bearing cap seal 90 includes a cross section having a bell shape. The bearing cap seal 90 is disposed annularly about the intermediate portion 56 of the collar 52, and engages the annular bore 24 near an outer edge of the annular bore 24, adjacent the inner surface 30 of the knuckle 22. Upon installation, the bearing cap seal 90 is compressed between the intermediate portion 56 of the collar 52 and the interior surface 50 of the annular bore 24.

The bearing cap seal 90 is coupled to an outer surface 28 of the intermediate portion 56 of the collar 52. Preferably, the bearing cap seal 90 is molded onto the outer surface 28 of the intermediate portion 56. However, it should be appreciated that the bearing cap seal 90 may be coupled to the intermediate portion 56 in some other manner not described herein.

Figure 9:
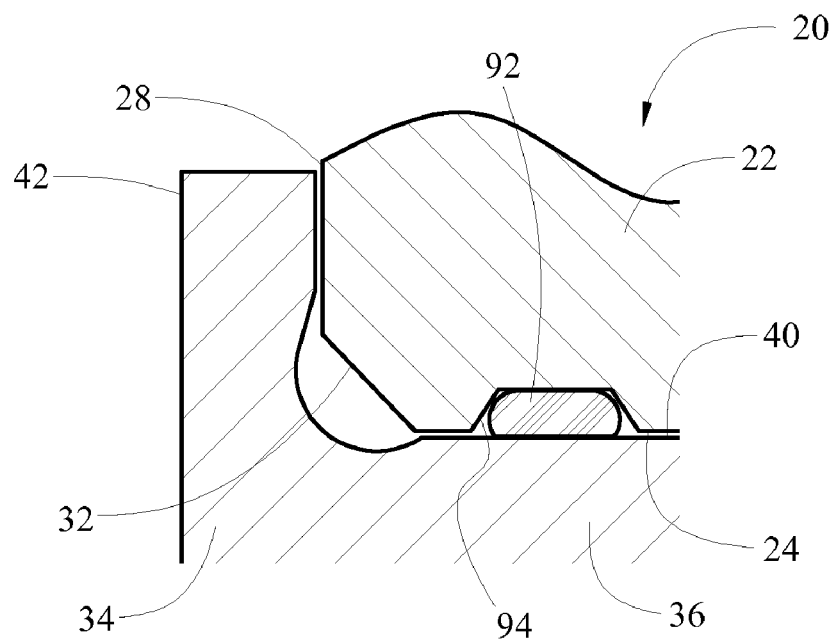
FIG. 9 is an enlarged fragmentary schematic cross sectional view of the wheel assembly shown in FIG. 1, showing a first embodiment of a second seal.

Referring to FIGS. 1 and 9, the wheel assembly 20 may include a second seal 92. A first embodiment of the second seal is shown generally at 92 in FIGS. 1 and 9. The second seal 92 is disposed between the annular bore 24 and the outer portion 36 of the outer ring 34. Preferably, the second seal 92 includes a rubber O-ring, or similar sealing device. However, it should be appreciated that the second seal 92 may include some other type of seal not described herein. The annular bore 24 includes an undercut 94, with the second seal 92 partially disposed within the undercut 94. The second seal 92 engages the outer portion 36 of the outer ring 34 in sealing engagement upon installation of the outer ring 34 into the annular bore 24 of the knuckle 22.

The second seal 92 operates to seal the engagement interface 40 between the knuckle 22 and the outer ring 34 from contaminants that may enter the engagement interface 40 from an outer side of the wheel assembly 20. Accordingly, it should be appreciated, that the second seal 92 and the bearing cap 48 seal operate together to seal the engagement interface 40 from contamination from both the inner side and the outer side of the wheel assembly 20, thereby minimizing the possibility of corrosion between the knuckle 22 and the outer ring 34.

Figure 10:
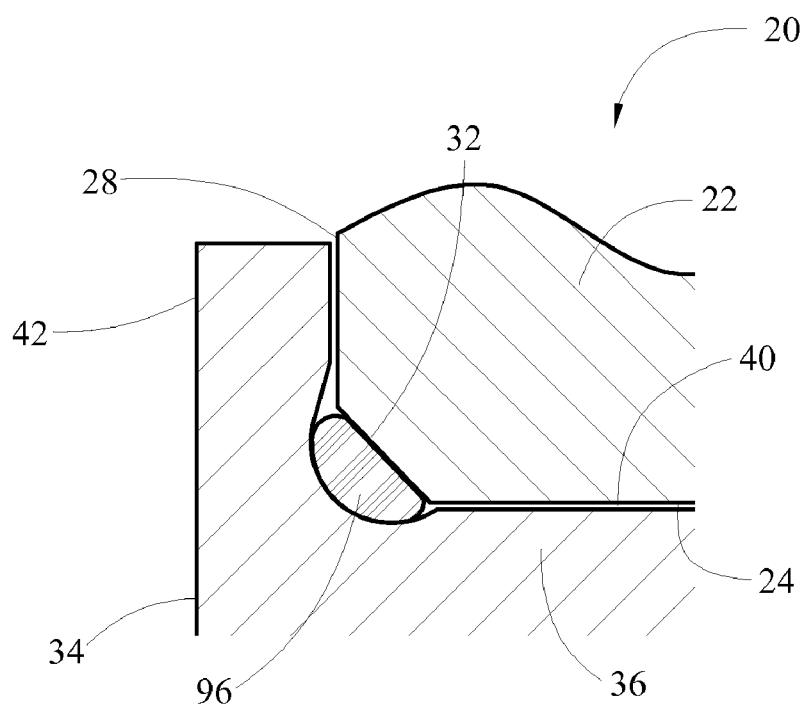
FIG. 10 is an enlarged fragmentary schematic cross sectional view of the wheel assembly shown in FIG. 3, showing a second embodiment of the second seal.

Referring to FIGS. 3 and 10, a second embodiment of the second seal is shown generally at 96. The second seal 96 is disposed between the chamfered end 32 of the annular bore 24 and an intersection defined between the flange 42 and the outer portion 36 of the outer ring 34. Accordingly, no undercut is required in the annular bore 24.

It should be appreciated that either the first embodiment of the second seal 92 or the second embodiment of the second seal 96 may be used independently of or in conjunction with any of the first embodiment of the bearing cap seal 60, the second embodiment of the bearing cap seal 66, the third embodiment of the bearing cap seal 78 or the fourth embodiment of the bearing cap seal 90.

While the best modes for carrying out the invention have been described in detail, those familiar with the art to which this invention relates will recognize various alternative designs and embodiments for practicing the invention within the scope of the appended claims.

The invention claimed is:
1. A wheel assembly comprising;
a knuckle defining an annular bore and configured for attachment to a vehicle;
an outer ring at least partially disposed within said annular bore of said knuckle and defining an interior space;

a bearing disposed within said interior space of said outer ring; and a bearing cap press fit onto an outside diameter of said outer ring and configured for spanning across an end of said interior space of said outer ring to prevent contamination of said bearing;

wherein said bearing cap includes a seal in sealing engagement with said annular bore of said knuckle to prevent contamination between said knuckle and said outer ring.

2. A wheel assembly as set forth in claim 1 wherein said bearing cap includes a face spanning across said interior opening and a collar extending from an outer periphery of said face along a longitudinal axis to a distal edge.

3. A wheel assembly as set forth in claim 2 wherein said collar includes an intermediate portion engaging said outside diameter of said outer ring and a raised lip disposed radially outward from said longitudinal axis relative to said intermediate portion and adjacent said distal edge of said collar.

4. A wheel assembly as set forth in claim 3 wherein said seal is disposed adjacent said distal edge of said collar, and includes a first portion disposed between said raised lip and said outer ring, and a second portion extending radially outward into sealing engagement with said annular bore of said knuckle.

5. A wheel assembly as set forth in claim 4 wherein said seal includes a third portion disposed between said raised lip and said annular bore and cooperating with said first portion to define a channel between said first portion and said third portion for receiving said distal edge of said collar therein.

6. A wheel assembly as set forth in claim 5 wherein said third portion of said seal extends along said longitudinal axis from said distal edge of said collar to said intermediate portion of said collar to encapsulate said raised lip.

7. A wheel assembly as set forth in claim 5 wherein said first portion, said second portion and said third portion of said seal are integrally formed together.

8. A wheel assembly as set forth in claim 3 wherein said seal is disposed annularly about said intermediate portion of said collar and engages said annular bore near an outer edge of said annular bore.

9. A wheel assembly as set forth in claim 8 wherein said seal is coupled to an outer surface of said intermediate portion of said collar.

10. A wheel assembly as set forth in claim 3 wherein said outer ring includes an outer portion having an outside diameter and an inner portion axially spaced from said outer portion along said longitudinal axis and having an outside diameter less than said outside diameter of said outer portion, wherein said outer portion of said outer ring engages said annular bore of said knuckle to define an engagement interface therebetween.

11. A wheel assembly as set forth in claim 10 wherein said intermediate portion of said collar engages said outside diameter of said inner portion of said outer ring.

12. A wheel assembly as set forth in claim 10 further comprising a second seal disposed between said annular bore and said outer portion of said outer ring.

13. A wheel assembly as set forth in claim 11 wherein said annular bore includes an undercut with said second seal partially disposed within said undercut and engaging said outer portion of said outer ring in sealing engagement.

14. A wheel assembly as set forth in claim 12 wherein said outer ring includes a flange extending radially outward from said outer portion away from said longitudinal axis for engaging a surface of said knuckle, and said annular bore includes a chamfered end, with said second seal disposed between said chamfered end of said annular bore and an intersection defined between said flange and said outer portion of said outer ring.

15. A bearing cap for a sealing between an outer ring and a knuckle of a wheel assembly, the bearing cap including:
    a face configured for spanning across an interior space of the outer ring;
    a collar extending from an outer periphery of said face along a longitudinal axis to a distal edge and configured for engaging an outside diameter of the outer ring; and
    a seal disposed on said collar and configured for engaging an annular bore of the knuckle to prevent contamination between the knuckle and the outer ring.

16. A bearing cap as set forth in claim 15 wherein said collar includes an intermediate portion configured for engaging the outside diameter of the outer ring, and a raised lip disposed radially outward from said longitudinal axis relative to said intermediate portion and adjacent said distal edge of said collar.

17. A bearing cap as set forth in claim 16 wherein said seal is disposed adjacent said distal edge of said collar, and includes a first portion disposed between said raised lip and the outer ring, and a second portion extending radially outward into sealing engagement with the annular bore of the knuckle.

18. A bearing cap as set forth in claim 17 wherein said seal includes a third portion disposed between said raised lip and the annular bore and cooperating with said first portion to define a channel between said first portion and said third portion for receiving said distal edge of said collar therein.

19. A bearing cap as set forth in claim 18 wherein said third portion of said seal extends along said longitudinal axis from said distal edge of said collar to said intermediate portion of said collar to encapsulate said raised lip.

20. A bearing cap as set forth in claim 16 wherein said seal is disposed annularly about said intermediate portion of said collar and engages the annular bore near an outer edge of the annular bore.

\* \* \* \* \*